March 30, 1943.  M. A. STICELBER  2,315,230
COMBINATION DOUGH MIXER REFRIGERATING MEANS AND WATER COOLING DEVICE
Filed June 20, 1941  2 Sheets-Sheet 1
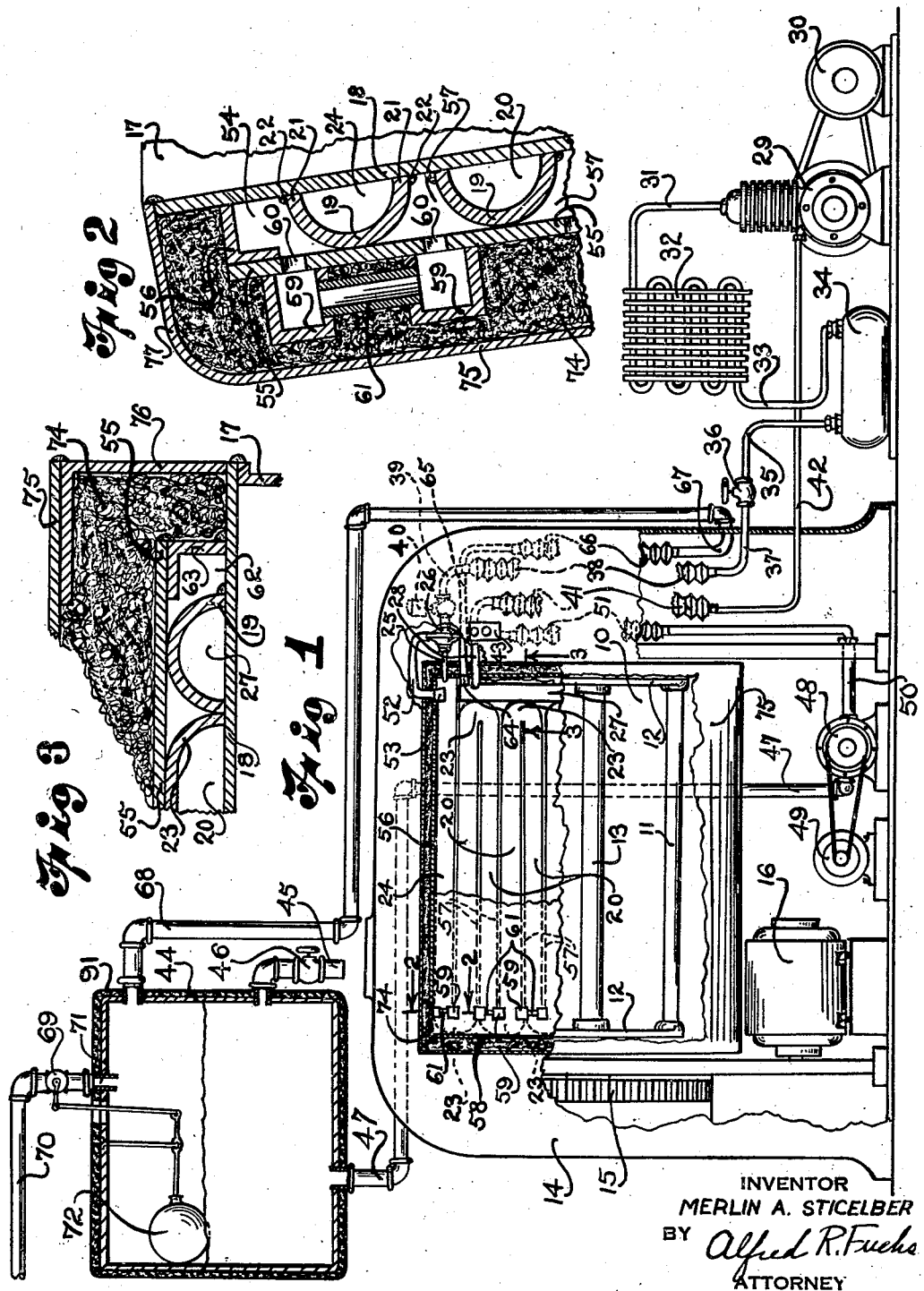
INVENTOR
MERLIN A. STICELBER
BY Alfred R. Fuchs
ATTORNEY

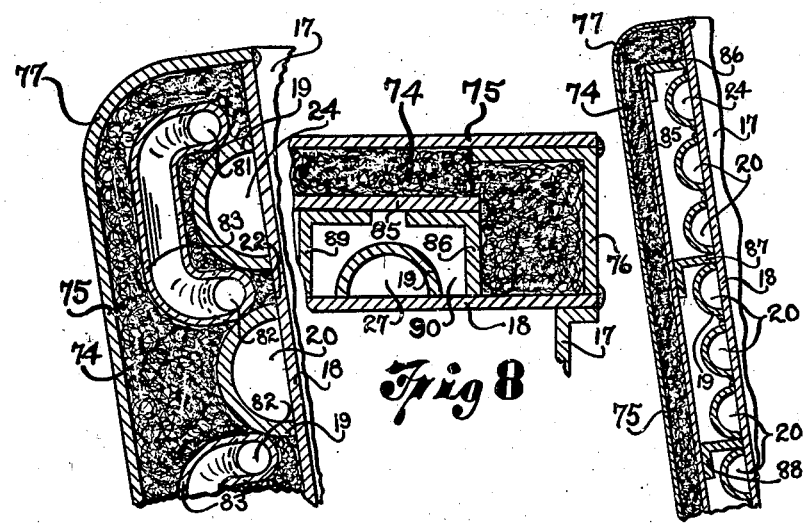
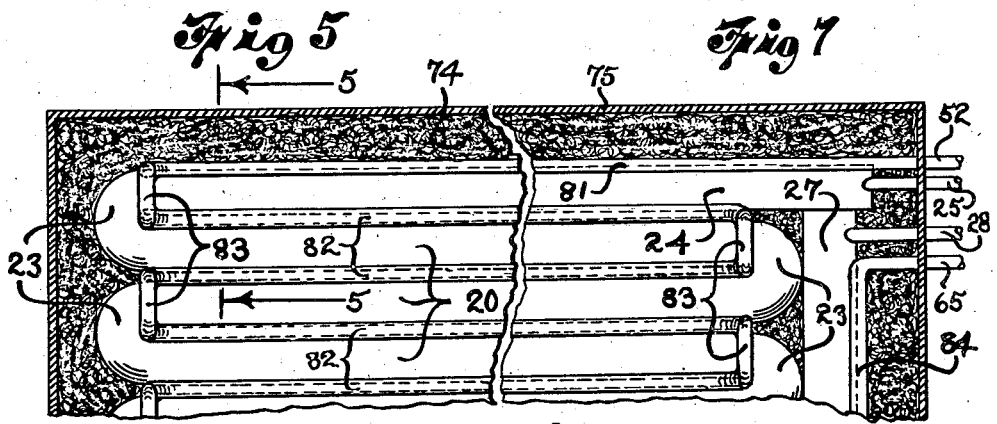
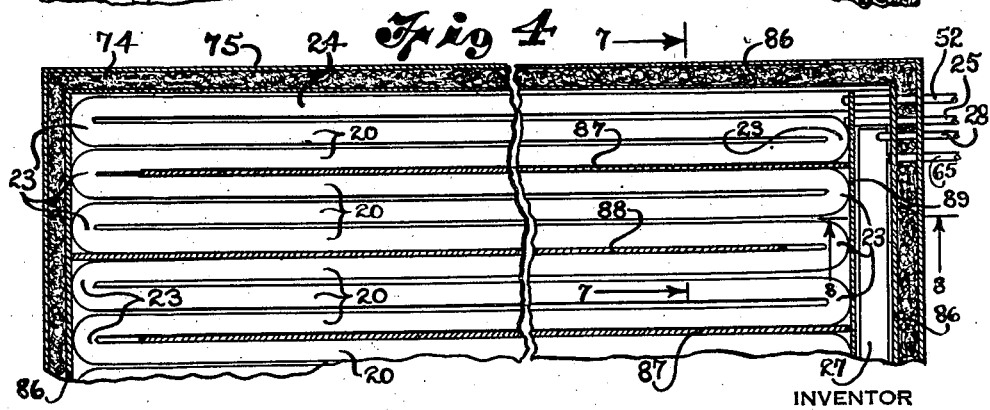

Patented Mar. 30, 1943

2,315,230

UNITED STATES PATENT OFFICE 2,315,230

COMBINATION DOUGH MIXER REFRIGERATING MEANS AND WATER COOLING DEVICE

Merlin A. Sticelber, Kansas City, Mo.

Application June 20, 1941, Serial No. 398,930

22 Claims. (Cl. 62—1)

My invention relates to a combination refrigerating means for dough mixers and water cooling device. The refrigerating means utilized is similar to that provided for dough mixers in my application Serial No. 364,903, filed November 8, 1940, on Refrigerated dough mixer which has matured into Patent No. 2,274,220, February 24, 1942.

In mixing dough one of the ingredients in all doughs is, of course, water, and this is commonly referred to as "make-up" water. In the art of mixing dough it is desirable to carry on the mixing action to a stage such that the highest gluten development of the flour in the dough can be obtained. This is accomplished by the mixing, or kneading, action of the agitator members, or beater arms, in the dough mixer, and is dependent upon the length of time that the mixing operation takes place, as well as the rate at which it takes place. Due to the heat generated in the agitating process, or mixing process, caused by the mechanical movement of the mass within the mixer, as well as by the heat developed by the action of the yeast on the dough, there is a gradual rise in temperature of the contents of the dough mixer, ordinarily, from the beginning of the mixing operation, which rise in temperature is accelerated as the operation proceeds. As it is harmful to the quality of the dough to have the temperature thereof rise above a certain point in the mixer, it has been previously necessary to shorten the mixing operation below the most desirable for gluten development, to prevent too high temperature in the dough mixer. In accordance with my above referred to invention, a method has been provided and means has been provided for carrying out the mixing of a dough, whereby the mixing operation can be carried out to the full extent desired, without any harm being done to the dough and the best results obtained by the mixing operation, such as obtaining the greatest development of gluten in a dough mixture, without having the temperature rise to a point that is too high for the dough.

It is common practice to start a dough with cold water, the water being as near to the freezing point as practicable when the mixing of the dough is started, and in order to obtain the most desirable results, it is desirable to use such cold water in my improved dough mixer, as well as in any other dough mixer. The use of ice to get the dough to a low temperature is not desirable, because the melting ice increases the water content of the dough, which has to be compensated for, and also causes considerable inconvenience and requires calculation to get the proper moisture content in the dough. Accordingly it is customary to provide means for cooling the make-up water, even though my improved refrigerated dough mixer is utilized in the mixing of the dough, as usually the tap water is at a relatively high temperature, and it is undesirable to unnecessarily warm the mixture by such relatively warm water, the warm water not only lowering the efficiency of the refrigerated mixture when it enters the same with the other ingredients of the dough, but preventing the highest efficiency and best results obtainable in any dough mixer, a refrigerated one as well as any other kind.

It is accordingly a purpose of my invention to provide a dough mixer in which means is provided for simultaneously cooling make-up water and the wall, or walls, of the dough mixer to refrigerate the contents thereof in the manner pointed out in my above referred to application.

It is a further purpose of my invention to utilize the same cooling means or expansion coil for cooling the water, that cools the walls of the mixer, to thus avoid any duplication of any parts and avoid the necessity of providing a separate refrigerating system for the make-up water.

It is a particular purpose of my invention to provide in a dough mixer, means for refrigerating the wall thereof, in combination with a storage receptacle for make-up water, means for conducting the make-up water in heat conducting relation to the refrigerating means for the walls of the dough mixer, and means for circulating the water between the storage receptacle and the means in heat conducting relation to the refrigerating means for the mixer wall, to keep a constant flow of water circulating through the cooling means thus provided for the water.

It is a specific purpose of my invention to provide a dough mixer with channel members secured to the wall thereof in such a manner as to provide a circuitous conduit for refrigerant, in heat conducting relation to said wall, and means providing passages for water in heat transfer relation to said refrigerant conduits, so that said water will have a circuitous path in heat transfer relation to the refrigerant conduits, whereby the water will be cooled simultaneously with the dough mixer wall.

Other objects and advantages of my invention will appear as the description of the drawings proceeds. I desire to have it understood, however, that I do not intend to limit myself to the particular details shown or described, except as defined in the claims.

In the drawings:

Fig. 1 is a view partly in elevation and partly in section and somewhat diagrammatic, of a dough mixer, the cooling means therefor, and the make-up water supply and cooling means for said make-up water.

Fig. 2 is a fragmentary sectional view of the dough mixer wall and associated parts, taken on the line 2—2 of Fig. 1 on an enlarged scale.

Fig. 3 is a similar view of the dough mixer wall, taken on the line 3—3 of Fig. 1 on an enlarged scale.

Fig. 4 is a fragmentary view partly in section and partly in elevation of a modified form of the refrigerating means applied to a dough mixer wall.

Fig. 5 is a section taken on the line 5—5 of Fig. 4 on an enlarged scale.

Fig. 6 is a view similar to Fig. 4, of a further modification.

Fig. 7 is a section on a slightly enlarged scale, taken on the line 7—7 of Fig. 6, and Fig. 8 is a section on a somewhat enlarged scale, taken on the line 8—8 of Fig. 6.

Referring in detail to the drawings, in Fig. 1 wherein is shown a dough mixer having a body portion or bowl 10, and beater arms, or agitator members 11, operating in the chamber formed within the body portion, or bowl, which are mounted in any suitable manner for rotation about an axis, such as on the spider 12, fixed to the shaft 13 to rotate therewith. The shaft is mounted on suitable bearing members and rotated by means of suitable gearing enclosed in a housing 14, said gearing driving a large gear wheel 15, fixed to the shaft 13, from a motor 16. The body portion of the mixer is provided with end walls 17, through which the shaft 13 extends, said body portion being tiltable on said shaft by means of suitable mechanism, which is not shown, as it operates in a well known manner. Extending between the walls 17 is a wall that, together with the walls 17, forms a bowl which has a curved bottom portion and inclined walls 18 leading to the open top of the mixer bowl. The mixer bowl is shaped as shown in my co-pending application. The particular shape of the mixer bowl is of no particular importance in connection with this invention, except that the beater arms, or agitator members, as the same rotate, throw the dough into contact with the wall portions of the mixer that are refrigerated. The particular portions of the walls of the bowl that are refrigerated, can be varied as may be found desirable in designing the mixer, that is, the extent of the refrigerated wall surface can be varied as may be desired.

The refrigerating element shown in the various forms of the invention illustrated herein, comprises a continuous circuitous conduit secured to the exterior wall of the mixer over the flat portions of the inclined walls 18 and the curved bottom thereof, and comprises a plurality of spaced refrigerant passages connected in series. While various means for providing these passages forming the continuous circuitous conduit for the refrigerant in heat conducting relation to the walls of the mixer may be provided in the manufacture of the dough mixers, or body portions of dough mixers, having such refrigerating means built into the same, preferably, channel members are used for this purpose. Preferably, the channel members are of a curved cross section, or substantially half cylindrical in cross section. These can be formed by a die into this shape or by splitting a tubular member of the proper size. The channel members 19 shown in the drawings, preferably, have the edges 21 thereof secured in fluid tight relation to the wall portion of the mixer, such as the wall portion 18, which the same engage, by welding, as indicated at 22, although any other suitable manner of securing the same along their edges in fluid tight relation to the mixer wall may be utilized. The same may be made of any suitable material, such as sheet metal, if desired. Preferably, a good heat conductor, such as copper, or brass, is utilized for these channel members.

The channels are, of course, cut to suitable size and shape and the sections thereof secured together in liquid tight relation to each other, by welding, or in any other similar manner, to provide a refrigerating coil, or element, that is made up of a plurality of parallel passages, said lengths being indicated by the numeral 20 in Fig. 1, and are shown as running parallel to the axis of the mixer body, or bowl, connecting portions 23 being provided for connecting the adjacent lengths 20 of the coil thus formed, alternately near the opposite end walls 17 of the mixer, so as to provide a continuous, sinuous, circuitous path for the refrigerant along the wall of the dough mixer in heat transfer relation thereto over that portion of the wall that is desired to be refrigerated. The uppermost transverse conduit portion 24 on one inclined wall 18 of the bowl is provided with a connection 25 leading from the expansion valve 26, and the uppermost transverse conduit on the other inclined wall 18 of the bowl has a conduit 27 extending therefrom, made of a channel member 19 in the manner previously described, which conduit extends circumferentially around the mixer bowl back to and adjacent the conduit portion 24, as will be clear from Fig. 1 of the drawings, and which has the suction pipe 28 connected therewith, the arrangement of conduits described being substantially as shown in my copending application above referred to.

Any suitable refrigerating system can be utilized for circulating the refrigerant and causing the same to go through the expansion and condensation cycles required, as long as a direct expansion system is utilized for cooling the walls of the dough mixer, a conventional system being shown in Fig. 1 of the drawings. Said system comprises a compressor, or pump, 29 driven by a motor 30, from which the conduit 31 leads to a condenser 32, from which a conduit 33 extends to the receiver 34. From the receiver the conduit 35 extends to a manually operated valve 36, and from said valve 36 the conduit 37 extends to a flexible expansible and contractable conduit portion 38 of the metallic bellows type, to allow for the movements of the mixer bowl between the two alternative positions that it assumes. The conduit 38 leads through a conduit 39 to an electro-magnetic valve 40, which is, preferably, interposed between the receiver and the expansion valve 26, and which operates to cut off flow of refrigerant through the expansion valve when the circuit to the motor 30 is broken by a thermostatic controlling means, as will be described below.

The gas return conduit, or suction pipe, 28, is provided with a flexible expansible and contractable conduit portion 41, similar to the conduit portion 38 previously described, from which the conduit 42 leads to the compressor 29.

Suitable controlling and indicating means is provided for controlling and indicating the temperature of the dough mixer walls and the dough in the mixer, such as shown in my co-pending application. Suitable thermostatic controlling elements are provided for controlling the cooling of the wall of the mixer, the particular controlling elements not forming a part of this invention, but being, preferably, of the type shown in my co-pending application above referred to. Any temperature responsive switching means adjustable to a temperature indicated on a dial forming part of the means, which will close a circuit when a predetermined temperature is reached, and maintain said circuit closed for any temperature above that indicated, being suitable for the purposes of my invention, as long as the same are in heat transfer relation to the refrigerated wall of the mixer and responsive to the temperature thereof. Other controlling means, such as time actuated means, may also be provided to control the temperatures of the mixer wall, if this is desirable.

A manually operated switch, such as the switch 43, may be provided for controlling the operation of the motor 30. The valve 36 is provided for the purpose of preventing undue gas pressure on the pump 29, which might blow out a gasket, by manually closing this valve when the mixer is shut down for the day. The refrigerating fluid in the expansion coil will pass into the suction pipe 42 and through the pump 29 upon operation of said pump by the motor provided for driving the same. By setting the thermostatic controlling elements, which open and close the circuit to the motor, as well as to the electromagnetic valve 40 in response to temperature changes of the mixer bowl wall, at a very high temperature, the motor will very seldom function after the operation of the dough mixer has ceased, but whenever it does, the refrigerant in the form of a gas will be pumped out of the expansion coil into the condenser and stored in the receiver. This will continue until a state of equilibrium in the system is reached. In order to accomplish this operation, the switch 43 is left closed while the device is in operation. If the switch 43 were opened and the valve 36 were not provided, then the expansion of the refrigerant in the expansion coil as the wall of the mixer rises in temperature during a long period of inoperativeness of the mixer would cause pressure to be built up that would enter the pump 29 and build up excessive pressure therein, which is avoided by the provision of the valve 36. This will prevent return of the refrigerant to the evaporator through the expansion valve.

The electro-magnetic valve 40, upon being energized, opens to permit flow through the conduit 35, provided, of course, that the valve 36 is open, the operation of said valve 40 being controlled by the thermostatic controlling elements, and suitable means for selecting the temperatures at which said elements open and close the circuit to the valve 40 and motor 30.

It will thus be seen that the flow of refrigerant through the circuitous conduit provided by means of the channel members 19, will be controlled thermostatically through the electro-magnetic valve 40, the temperature of the dough mixer bowl wall controlling the operation of the entire refrigerating means when the same is in normal operation.

In Fig. 1 is further shown a make-up water tank 44, which constitutes a storage receptacle for the make-up water, or water used for supplying the liquid content of the dough to be mixed in the mixer bowl. An outlet pipe 45, controlled by a valve 46, leads from a point spaced from the bottom of the tank 44, as will be obvious from Fig. 1, the discharge of the water being through the outlet pipe 45 into the mixer bowl in a well known manner. Said tank 44 also has a liquid conduit 47 extending therefrom, which leads to a pump 48 driven by a motor 49, the pipe 47 constituting the suction line for said pump 48, and the motor 49 being operated continuously to continuously circulate the water as long as the manually operated switch 43 is closed. The apparatus is preferably wired so that the switch 43 controls the operation of both the motor 49 and the motor 30, in such a manner that the circuit to both will be opened upon opening said switch. However, while the motor 30 is intermittently operated by means of the thermostatic control the motor 49 will be operating the pump 48 to continuously circulate the make-up water.

The discharge pipe 50 leading from the pump 48 is provided with an expansible and contractable portion 51, which connects the same with a pipe 52, which leads to an inlet connection 53 leading into the passage 54 provided between the uppermost refrigerant conduit portion 24, the plate-like member 55 and the angle member 56, said plate-like member 55 and the angle member 56 being welded in fluid tight relation to each other and the angle 56 being welded in fluid tight relation to the dough mixer wall 10, as will be obvious from Fig. 2. A plurality of passages 57 are provided between the adjacent channel members 19 and the plate-like member, or wall, 55, as will be obvious from Fig. 2 of the drawings, said passages terminating at one end thereof at the connecting portions 23, connecting the lengths of conduit, or refrigerant passages, 20, and at the other end thereof by either the conduit portion 27 or the end wall member 58, as the case may be, said end wall member 58 being formed of an angle member in a similar manner to that shown for the top wall 56 of the chamber provided within which the refrigerant conduits are located, disclosed in Fig. 2. As the passages thus provided are entirely separate from each other, but are arranged in parallel relation between adjacent refrigerant conduits formed by the channel members 19, it is necessary to provide some means for connecting said passages so as to provide a circuitous path for the water.

Such means is illustrated in detail in Fig. 2, and comprises box-like members 59 that are provided with open ends facing the plate-like member 55, and are mounted over openings 60 in said plate-like member, leading to adjacent water passages. The passage 54 and transverse passage 57 between adjacent channel members 19 are the adjacent passages shown in Fig. 2 as being connected by the connection illustrated in Fig. 2. A tube or conduit 61 is secured in liquid tight relation in openings in adjacent side walls of the box-like members 59 and the edges of the box-like members at the open ends thereof facing the plate-like member 55 are welded to said plate-like member to provide a liquid tight joint between said box-like members and the plate-like member. While the passages 54 and the passage 57 are shown as being so connected in Fig. 2, it will be obvious from Fig. 1 that similar connecting means is provided between pairs of passages 57 that are adjacent each other, the second and third passages below the entrance passage 54 being shown as being connected together in this manner at the left hand side of Fig. 1, as well as the fourth and fifth passages 57 below said entrance passage. It is, of course, to be understood that this connection of one pair of adjacent passages on one end of the mixer is alternated with the connection of the other pair of adjacent passages at the other end of the mixer, so that a circuitous path is formed by means of these connections cooperating with the parallel passages 57 provided between the plate 55 and the channel members 19. Thus, while the second and third passages below the entrance passage 54 are connected together by means of the box-like members 59, and the conduits 61 at the left hand end of the mixer, the first and second passages 57 below the passage 54 are connected together in this manner at the right hand end of the mixer.

This alternation of connections continues around the mixer wall to the passage 57 between the last pair of channel members 19 on the opposite wall 18 of the mixer from that illustrated in Fig. 2, and then through a passage similar to the passage 54, through a similar connection to that illustrated in Fig. 2 to a passage 62, which is, of course, connected with the passage similar to the passage 54 on the opposite side of the mixer wall 18 from that illustrated in Fig. 2, and which forms a water return passage and lies between the angle member 63, which is welded to the plate-like member 55 and to the wall 18 of the mixer, and the channel member 19 that forms the return conduit 27 for the refrigerant from the opposite side of the mixer from that shown in Figs. 1 and 2, said water return conduit 62 being of the same length substantially as the conduit 27 and having a connection provided, similar to one of the box-like members 59, at 64, to a cold water outlet pipe 65, which is provided with a flexible, expansible and contractable portion 66, similar to that previously described in connection with the other conduits provided, that lead to the dough mixer, to allow for the variation in the position of the bowl of the mixer. From said expansible and contractable conduit 66 a pipe 67 leads to a pipe 68 that extends into the upper portion of the tank 44. Said tank is, preferably, covered with insulation 81.

It will be seen from the above that a circuitous passage for the water is provided, that lies adjacent the circuitous refrigerant passage formed by the channel members 19, with only the heat conducting wall 19 of the channel members between said refrigerant passage and said water passage, the water thus being in heat transfer relation with the expansion coil formed by means of the channel members 19, and the water will, of course, be constantly circulated by the pump 48, thus preventing any accumulation of ice in the passages, even though a very low temperature of the water can be obtained by the refrigerating means therefor provided in this manner. A certain quantity of water will, of course, be kept stored in the tank 44, and means is provided for replenishing the supply of water in the tank 44, after withdrawal of a predetermined amount therefrom through the valve 46, said means comprising a valve 69 controlling the supply of tap water from the pipe 70 to the inlet connection 71, any suitable float valve, operated by any suitable float 72, being provided for this purpose. The inlet extending through the housing of the mixer through which the water and other ingredients for the dough mixture is introduced is shown at 73 in Fig. 1.

Suitable heat insulating means of any well known character, that has the desired efficiency, may be provided for the refrigerating means herein described, said heat insulating material being shown at 74 in Figs. 1 to 3, inclusive, and being confined between an outer sheath 75 and suitable marginal walls, such as the walls 76 and 77 shown in Figs. 2 and 3, and the walls of the chamber formed between the plate-like member 55 and the angle members, such as the angle member 56 connected with said plate-like member, and the mixer wall 18. Thus the refrigerant conduits are insulated from the atmosphere, except on the side thereof formed by the mixer wall 18. Also the water passages are all completely insulated from the atmosphere throughout the length thereof except where the same are in heat transfer relationship to the expansion coil formed on the wall of the dough mixer bowl by the channel members.

Instead of making the circuitous passage for the water in heat transfer relation to the circuitous passage for the refrigerant in the manner shown in Figs. 1 to 3, inclusive, the arrangement shown in Figs. 4 and 5 can be used, in which the refrigerant conduits are the same as previously described, bearing the same reference numerals, and in which the inlet connections for the refrigerant and for the water are indicated by the same numerals as in the previously described form of the invention, the only difference between this form and the one previously described being in the manner in which the water is conducted in its circuitous path in heat transfer relation to the refrigerant conduits, or evaporator. Said water cooling coil, or conduit, is made up of lengths of tubing, or pipe, of any suitable metal, preferably, of a metal that has high heat conducting properties, such as copper, or brass, that are connected together by welding, brazing, or in any other manner, to form a continuous conduit for the water from the inlet connection 52 to the cold water outlet pipe 65.

The circuitous conduit comprises a length 81 leading from the inlet connection 52, and similar parallel lengths of pipe, or tubing, 82 extending between adjacent refrigerant conduits 20 throughout the extent of the refrigerant expansion coil over the area of the mixer wall over which said expansion coil extends, the lengths 82 being connected with each other and with the length 81 by means of U-shaped connecting portions 83, which extend over and around the channel members 19 in the manner illustrated in Fig. 5, the same pipes 82 lying in the spaces between adjacent channel members 19 and in contact therewith, as shown in Fig. 5, so as to be in heat transfer relation thereto. The U-shaped members connect the lengths 82 of the tubing forming the cooling coil for the water in the manner illustrated in Fig. 5, to provide the circuitous passage for the water. The pipe 81 lies in engagement with only one side of the first channel member 19 of the expansion coil, while a similar pipe is provided at the other end of the expansion coil on the other wall 18 of the mixer opposite that shown in Figs. 4 and 5, from which the return pipe 84 extends to the cold water outlet pipe 65, in contact with the refrigerant return conduit 27. The heat insulating material is arranged in a similar manner to that previously described, and lies between a sheath, such as previously described, and bearing the same reference numerals as in Figs. 1 to 3, inclusive, and the channel members 19 and wall 18, and surrounding the lengths of tubing forming the water conduit, except where the same are in engagement with the channel members 19, as will be obvious from Figs. 4 and 5.

One of the most desirable ways of providing a circuitous water passage in heat transfer relation to the refrigerant conduits from the standpoint of providing tight joints and simplifying the construction, is that shown in Figs. 6, 7 and 8, in which the inlet pipe for the water and the cold water outlet pipe are designated by the same reference numerals as in the other forms of the invention, and in which the refrigerant expansion coil is made in the same manner as previously described and bears the same reference numerals. The entrance, or top, length of the refrigerant coil is indicated by the numeral 24 and the other parallel lengths by the numeral 20, as in the other forms of the invention. A chamber is provided surrounding the lengths of refrigerant coil 24 and 20 and the connecting portions 23, by providing a plate-like member 85, which is secured to the flanges of angle members 86 forming the marginal walls of the chamber, which are connected by welding or in a similar manner, with the wall of the dough mixer, such as the wall 18, and the plate-like member 85, to provide liquid tight joints between the members 86 and the walls 18 and 85. A chamber is thus provided that entirely encloses the entire refrigerant coil, including the return conduit 27, as will be obvious from Figs. 6 and 8. The chamber thus formed is partitioned in a manner to provide a circuitous conduit or path for the water from the inlet pipe 52 to the outlet pipe 65, by means of baffle members that are made up of angles 87 and 88. An angle member 89 is also provided, spaced from the angle member 86 along the right hand end of the chamber, as shown in Fig. 6, with the conduit 27 therebetween so as to form a passage 90 between the angle members 86 and 89, the wall 18, the channel member 19 and the plate-like member 85.

The angle members 87 and 88 are arranged in an alternating manner, so as to form baffles that are spaced from the side wall 86 at the left hand end of the chamber above referred to and the partition member formed by the angle 89, the wall portions 87 being secured in liquid tight relation to the partition 89, and the wall portions 88 being secured in liquid tight relation to the left hand end wall 86 to thus provide passages around the ends of the partitions formed by the members 87 and 88 that are located on opposite ends of the chamber for the water, thus providing a circuitous conduit for the water from the inlet connection 52 to the conduit 90, which is connected with the last of the passages formed by means of a transverse angle member 87, and a marginal wall portion 86 leading from one of the passages between one of the baffles 88 and one of the baffles 87 to said passage 90. A plurality of parallel refrigerant passages, or conduits, such as the passages 20, are provided in each length of the circuitous water passage thus formed, as will be evident from Fig. 7. The particular number of lengths of conduit provided in each water passage can, of course, be varied as may be found desirable to get the desired rate of circulation of the water in the passages to prevent formation of ice therein. The heat insulating material is provided between the sheath and the walls of the chamber provided by the plate 85 and the angles 86, in a similar manner to that previously described, and said sheath and insulating material bear the same reference numerals as applied thereto in Figs. 1 to 3, inclusive.

It is to be understood that in all forms of the invention the channel members can be made of any desired cross sectional shape, but that the semi-cylindrical shape is particularly desirable from the standpoint of strength, and also provides spaces for cooling the water between the same in the forms of the invention shown in Figs. 1 to 3, and 6 to 8, inclusive, no matter how closely the marginal portions of the channel members 19 may be arranged to each other. The spacing of the channel members can be varied as desired, but the same may be placed as close together as possible and yet permit welding of the edges to the mixer wall, if such close spacing is desirable to obtain the desired refrigerant action from the expansion coil formed therewith.

What I claim is:

1. The combination with a dough mixer having a mixing chamber, of means for supplying water to the interior of said mixing chamber and means externally of said chamber for cooling a wall of said chamber and simultaneously cooling said water before being supplied to the interior of said chamber.

2. The combination with a dough mixer having a mixing chamber, of means for feeding water into said mixing chamber and refrigerating means externally of said chamber for cooling a wall of said chamber and simultaneously cooling said water before being fed into said chamber.

3. The combination with a dough mixer, of a make-up water receptacle discharging into said mixer, a mixing chamber, direct expansion refrigerating means in heat transfer relation to a wall of said chamber, and means for circulating make-up water in heat transfer relation to said refrigerating means.

4. In a dough mixer, a mixing chamber having a wall and refrigerating means for said wall, comprising a refrigerant expansion chamber in direct heat transfer relation to said wall, said expansion chamber comprising a continuous circuitous conduit secured to said wall comprising a plurality of spaced refrigerant passages connected in series, and means providing a water conduit in heat transfer relation to said refrigerant conduit.

5. In a dough mixer, a mixing chamber having a wall and refrigerating means for said wall, comprising a refrigerant expansion chamber in direct heat transfer relation to said wall, said expansion chamber comprising a continuous circuitous conduit secured to said wall comprising a plurality of spaced refrigerant passages connected in series, and means providing a continuous circuitous water conduit in heat transfer relation to said refrigerant conduit.

6. In a dough mixer, a mixing chamber having a wall and refrigerating means for said wall, comprising a refrigerant expansion chamber in direct heat transfer relation to said wall, said expansion chamber comprising a continuous circuitous conduit secured to said wall comprising a plurality of spaced refrigerant passages connected in series, means providing a water conduit in heat transfer relation to said refrigerant conduit and means for continuously circulating make-up water through said water conduit.

7. In a mixer, a mixing chamber having a wall and refrigerating means for said wall, comprising a refrigerant expansion chamber in direct heat transfer relation to said wall, said expansion chamber comprising a plurality of spaced channel members, connected in series to form a continuous circuitous conduit, and means cooperating with said channel members to form a water conduit in heat transfer relation to said refrigerant conduit.

8. In a mixer, a mixing chamber having a wall and refrigerating means for said wall, comprising a refrigerant expansion chamber in direct heat transfer relation to said wall, said expansion chamber comprising a plurality of spaced channel members, connected in series to form a continuous circuitous conduit, and means cooperating with said channel members to form a water conduit in heat transfer relation to said refrigerant conduit, comprising a wall bridging adjacent channel members to form passages between the same and means connecting adjacent passages in series.

9. In a mixer, a mixing chamber having a wall and refrigerating means for said wall, comprising a refrigerant expansion chamber in direct heat transfer relation to said wall, said expansion chamber comprising a plurality of spaced channel members, connected in series to form a continuous circuitous conduit, and means cooperating with said channel members to form a water conduit in heat transfer relation to said refrigerant conduit, comprising a wall spaced from said channel members to provide a water chamber back of and between the same, and baffles in said water chamber extending to form a continuous circuitous passage thereof.

10. In a mixer, a mixing chamber having a wall and refrigerating means for said wall, comprising a refrigerant expansion chamber in direct heat transfer relation to said wall, said expansion chamber comprising a plurality of spaced channel members, connected in series to form a continuous circuitous conduit, and means cooperating with said channel members to form a water conduit in heat transfer relation to said refrigerant conduit, comprising water pipes alternating with said channel members and in heat transfer engagement therewith and means connecting adjacent pipes in series.

11. In a mixer, a mixing chamber having a wall, refrigerating means for said wall, comprising an expansion chamber in direct heat transfer relation to said wall, means for conducting water in heat transfer relation to said expansion chamber, and means for insulating said expansion chamber and water conducting means from the atmosphere.

12. In a dough mixer, a mixing chamber movable between alternative positions, refrigerating means for a wall of said chamber comprising an expansion coil in direct heat transfer relation to said wall, refrigerant conduit means leading to said coil comprising flexible conduit portions, a water cooling coil mounted on said mixing chamber in heat transfer relation to said expansion coil and conduit means leading to said water coil, comprising flexible conduit portions.

13. The combination with a dough mixer, of a make-up water receptacle, said dough mixer having a mixing chamber, refrigerating means for said chamber comprising an expansion coil, water cooling conduit means mounted in heat transfer relation to said expansion coil, a pump, and conduit means connecting said water cooling conduit means, said pump and said receptacle to circulate water between said cooling means and said receptacle.

14. The combination with a dough mixer, of a make-up water receptacle, said dough mixer having a mixing chamber, refrigerating means for said chamber comprising an expansion coil, water cooling conduit means mounted in heat transfer relation to said expansion coil, a pump, conduit means connecting said water cooling conduit means, said pump and said receptacle to circulate water between said cooling means and said receptacle, means for discharging water from said receptacle into said mixing chamber and means for maintaining a predetermined level of water in said receptacle.

15. In a mixer, a mixing chamber having a wall and refrigerating means for said wall, comprising a refrigerant expansion chamber in direct heat transfer relation to said wall, said expansion chamber comprising a plurality of spaced, substantially straight, parallel channel members arcuate in transverse section, and members providing passages connecting said channel members alternately in series at opposite ends thereof to form a continuous circuitous conduit.

16. In a mixer, a mixing chamber having a wall and refrigerating means for said wall, comprising a refrigerant expansion chamber in direct heat transfer relation to said wall, said expansion chamber comprising a plurality of spaced channel members arcuate in transverse section, connected in series to form a continuous circuitous conduit, and means cooperating with said channel members to form a water conduit in heat transfer relation to said refrigerant conduit.

17. The combination with a dough mixer, of a make-up water receptacle discharging into said mixer, a mixing chamber, refrigerating means in heat transfer relation to a wall of said mixing chamber, means for circulating make-up water in heat transfer relation to said refrigerating means, and means connecting said make-up water receptacle with said circulating means.

18. In a dough mixer, a mixing chamber, means therein for engaging dough with a wall thereof and refrigerating means for said wall in direct heat transfer relation to said wall, said refrigerating means comprising a continuous circuitous refrigerant conduit secured to said wall, comprising a plurality of spaced refrigerant passages connected in series, and means for supplying cooled make-up water to said mixing chamber comprising means providing a water conduit in heat transfer relation to said refrigerant conduit and means for continuously circulating make-up water through said water conduit.

19. In a mixer, a mixing chamber having a wall and refrigerating means for said wall in direct heat transfer relation to said wall, said refrigerating means comprising a plurality of spaced channel members, connected in series to form a continuous circuitous refrigerant conduit, and means cooperating with said channel members to form a water conduit in heat transfer relation to said refrigerant conduit, comprising a wall bridging adjacent channel members to form passages between the same and means connecting adjacent passages in series.

20. In a mixer, a mixing chamber having a wall and refrigerating means for said wall in direct heat transfer relation to said wall, said refrigerating means comprising a plurality of spaced channel members, connected in series to form a continuous circuitous refrigerant conduit, and means cooperating with said channel members to form a water conduit in heat transfer relation to said refrigerant conduit, comprising a wall spaced from said channel members to provide a water chamber back of and between the same, and baffles in said water chamber extending to form a continuous circuitous passage thereof.

21. In a mixer, a mixing chamber having a wall and refrigerating means for said wall in direct heat transfer relation to said wall, said refrigerating means comprising a plurality of spaced channel members, connected in series to form a continuous circuitous refrigerant conduit, and means cooperating with said channel members to form a water conduit in heat transfer relation to said refrigerant conduit, comprising water pipes alternating with said channel members and in heat transfer engagement therewith and means connecting adjacent pipes in series.

22. The combination with a dough mixer, of a make-up water receptacle, said dough mixer having a mixing chamber, refrigerating means for said chamber comprising a refrigerant coil, water cooling conduit means mounted in heat transfer relation to said refrigerant coil, a pump, and conduit means connecting said water cooling conduit means, said pump and said receptacle to circulate water between said cooling means and said receptacle.

MERLIN A. STICELBER.